United States Patent [19]

Zettl

[11] Patent Number: 4,761,101

[45] Date of Patent: Aug. 2, 1988

[54] ARRANGEMENT FOR WIRELESS SIGNAL TRANSMISSION FROM A ROTATING BODY TO A STATIONARY RECEIVING STATION

[76] Inventor: Otto Zettl, Fellenbergstr. 9, D-8969 Reicholzreid, Fed. Rep. of Germany

[21] Appl. No.: 948,321

[22] Filed: Dec. 31, 1986

[30] Foreign Application Priority Data

Jan. 10, 1986 [DE] Fed. Rep. of Germany ....... 3600466

[51] Int. Cl.$^4$ .................... B23B 49/00; G08B 21/00
[52] U.S. Cl. .......................................... 408/6; 73/660; 340/680; 340/683; 408/11; 408/16
[58] Field of Search ................ 408/16, 9, 6, 11; 340/679, 680, 683; 73/104, 660; 409/134, 187, 194; 364/508

[56] References Cited

U.S. PATENT DOCUMENTS

| | | | |
|---|---|---|---|
| 3,872,285 | 3/1975 | Shum et al. | 73/660 |
| 4,090,802 | 5/1978 | Bilz | 408/6 |
| 4,478,538 | 10/1984 | Kakino | 340/683 |

OTHER PUBLICATIONS

Guide to Analog Signal Conditioning, 1980, D. H. Sheingold, pp. 21, 29, 194–198, 222–228.
Balluff Product Guide, Neuhausen/West-Germany.
Kistler Catalogue, 7/1987, Winterthur, Switzerland.
Helatronik Prospectus, 12/1984, Grafrath, Germany.
Hertel Prospectus, Germany.
Kennametal Prospectus, 1987, Latrobe, PA.
Prometec Prospectus, 10/1987, Aachen, Germany.

*Primary Examiner*—Neil Abrams
*Attorney, Agent, or Firm*—Angelo Notaro

[57] ABSTRACT

A rotating body, for example a chuck (10) comprises a sensor (56), a signal processing unit with amplifier and a plurality of transmitting diodes (14) and receiving diodes (16) peripherally spaced in a radial plane, in which also a stationary transceiving station (18) is arranged. The sensor (56) detects special working conditions of a tool clamped in the chuck (10). Signals of sensor (56) are fed to the signal processing unit. Sense commands transmitted from the transceiving station (18) via receiving diodes (16) are processed in the processing unit during rotation of the chuck (10) and corresponding working condition signals are transmitted from the transmitting diodes (14) back to the transceiving station (18).

12 Claims, 8 Drawing Sheets

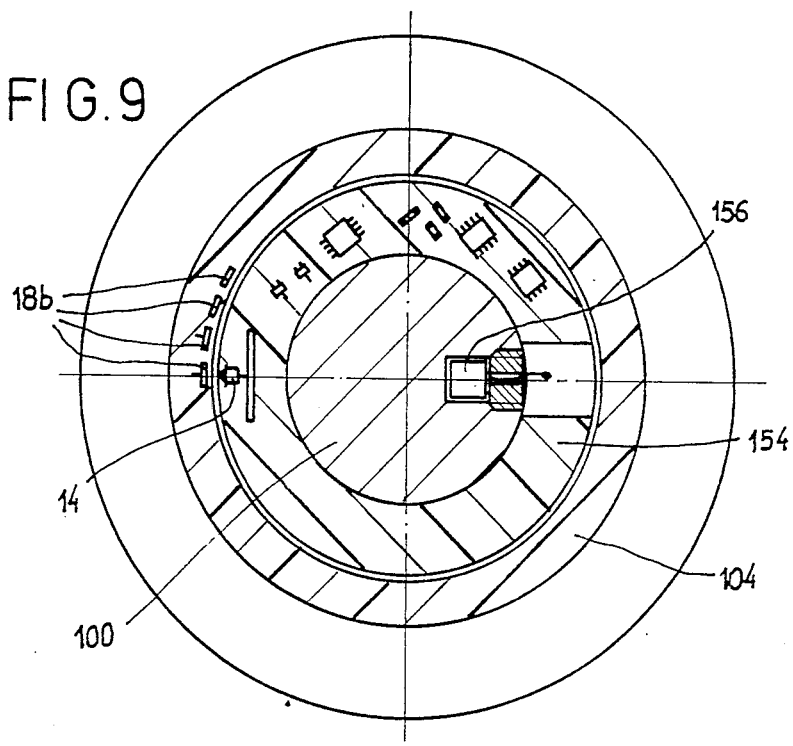
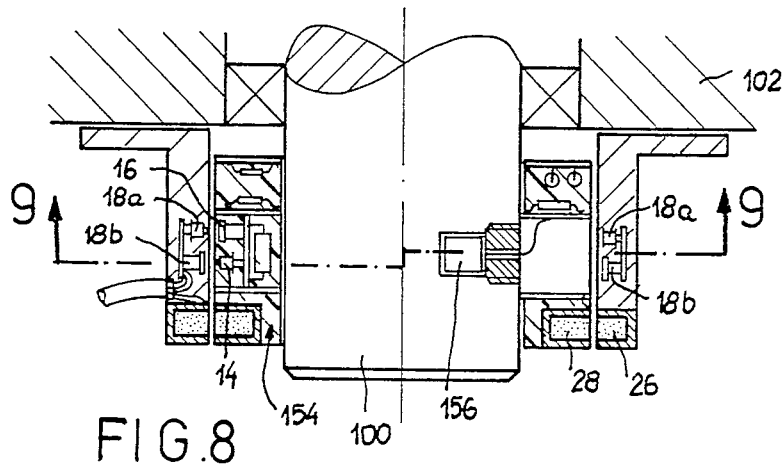

4,761,101

ARRANGEMENT FOR WIRELESS SIGNAL TRANSMISSION FROM A ROTATING BODY TO A STATIONARY RECEIVING STATION

BACKGROUND OF THE INVENTION

The invention relates in general to an arrangement for wireless signal transmission from a rotating body to a stationary receiving station. A detector is mounted in the rotating body in order to detect a change in the working condition of an item carried by the rotating body. If such a change has been detected a signal is given to a transmitter of the rotating body. The transmitter sends an information to a receiving station.

From U.S. Pat. No. 4,090,802 a chuck is known having a safety clutch so as to prevent overload resulting from broken or dull tools. In case of an overload the safety clutch is operated, closing a switch whereby a transmitter is energized by an accumulator within the chuck housing and generates a high frequency signal which is transmitted to a receiver remotely mounted from the chuck so as to present an audio, optical display or can actually turn off the machine provided with the chuck.

However, by this known concept only a yes-or-no information can be detected and transmitted.

According to another prior art a pressure sensitive element is mounted stationary in a machine head so as to be loaded by the reaction force of the tool. The output of the pressure sensitive element is amplified and transmitted to a display. Indeed a continuous control of the reaction force of the tool is achieved thereby however, because the detector is arranged in the stationary machine head and not in the rotating spindle itself, the detected values are inaccurate and for example influenced by the friction of the bearing. Malfunctions can occur by vibrations of the machine and other influences.

SUMMARY OF THE INVENTION

One object of the invention is to provide an arrangement in order to detect a plurality of accurate values of different working conditions continuously or at intervals avoiding any influences generated outside of the rotating body.

A further object of the invention is to provide an arrangement by which vibrations of the rotating body can be detected for optimization of tool speed or recognition of unusual working conditions etc. By the invention it should be achieved to recognize an imminent danger of break of tools, workpieces, turbines etc. in order to stop the drive prior to rupture.

A further object of the invention is to provide an arrangement by which the information sent by the transmitter of the rotating body can be influenced from a remote place. Especially, communication shall be possible between a signal processing unit within the rotating body and a remote control station.

Last but not least it is one object of the invention to provide an arrangement for wireless signal transmission from a rotating body to a stationary receiving station comprising a current supply unit at least partly incorporated within the rotating body, the rotating body further comprising a receiving unit for receiving signals from a stationary transmitting station, a signal processing unit, a high precision sensor unit detecting infinitesimal changes of working condition of an item carried by said rotating body, and a transmitting unit for transmission of signals to the receiving station, the signal processing unit operatively connected with the sensor unit and the receiving and transmitting units respectively, thereby making the output signal of the transmitting unit dependent on the input signal of the receiving unit.

Thanks to the invention momentary values of different working conditions can be interrogated, as clamping force of a tool in a chuck, condition of the cutting edges of tools, begin progress and end of a working process, condition of a work piece etc. Besides of that the signal processing unit can automatically activate the amplifier and the signal transmitting unit after having recognized a special dangerous working condition, for example a special mode of vibration in order to transmit a warning signal or to stop a machine. Also a turbine can automatically be braked down after an out-of-balance condition or unusual vibrations have been detected. Further any dynamical signals can be detected and processed in order for example to control the combustion process of an internal combustion engine or to activate lubrication after a change of the bearing noise has been recognized.

Other objects, features and advantages of the invention will be readily apparent from the following description of certain preferred embodiments thereof and from the claims.

BRIEF DESCRIPTION OF THE DRAWINGS

FIG. 8 is a sectional view of an end of a shaft of the turbine of FIG. 7 in a larger scale;

FIG. 9 is a sectional view of tubine shaft end, taken along line 9—9 of FIG. 8;

DESCRIPTION OF THE PREFERRED EMBODIMENTS

Figure 1:
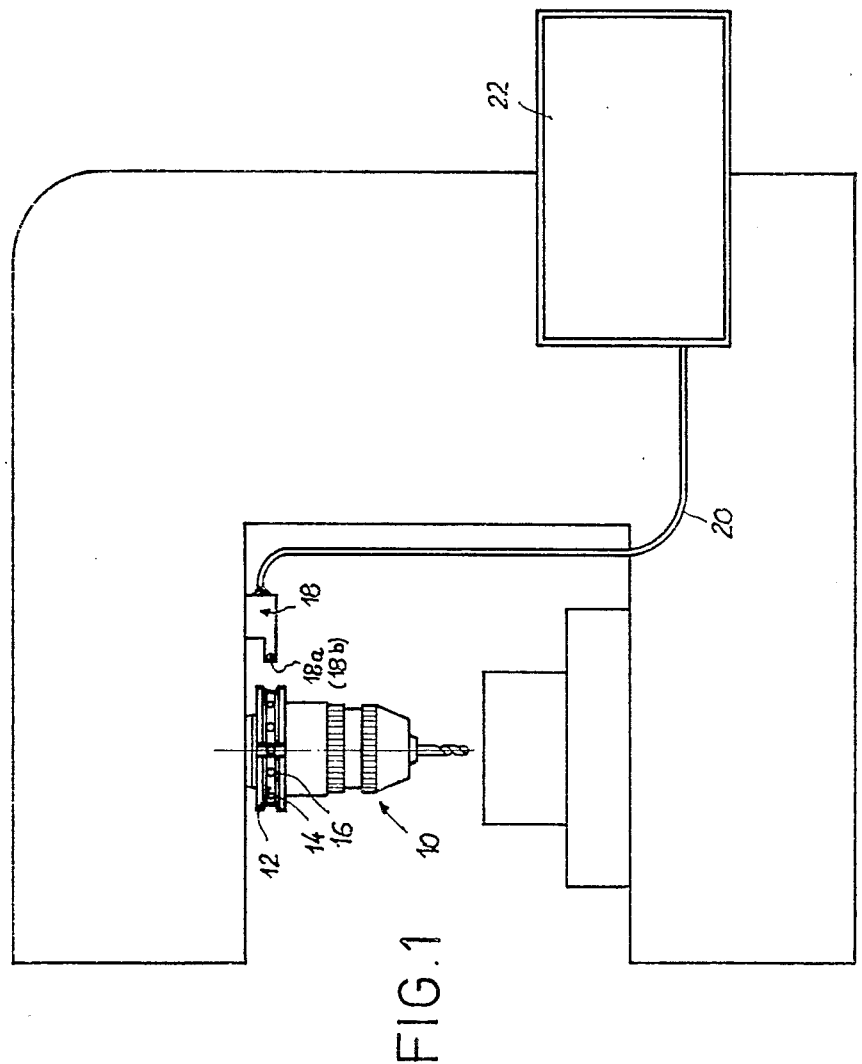
FIG. 1 is a side view of a drilling machine.
Figure 3:
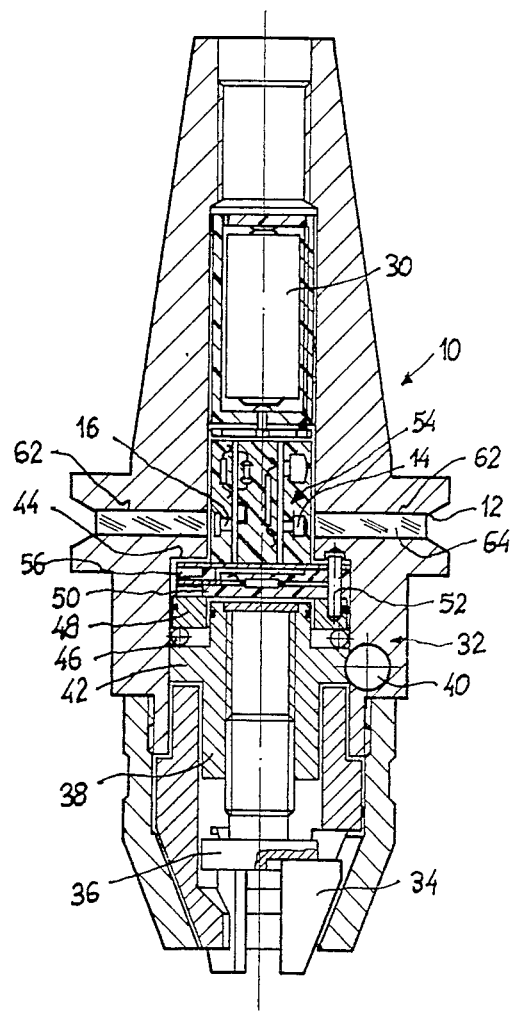
FIG. 3 is a sectional view of a chuck.

With respect to FIGS. 1 and 3 a chuck 10 of a drilling or milling machine has an outside flange with a gripping groove 12 in the base of which openings of a plurality of radial bores 62 are provided. In the interior of the chuck a plurality of transmitting diodes 14 and a plurality of receiving diodes 16 are arranged radially aligned with the bores 62 respectively. A stationary transceiving station 18 is arranged at the machine frame adjacent to the gripping groove 12 and in the radial plane of the bores 62. The transceiving station 18 is connected with a control and display unit 22 via cable 20.

Figure 2:
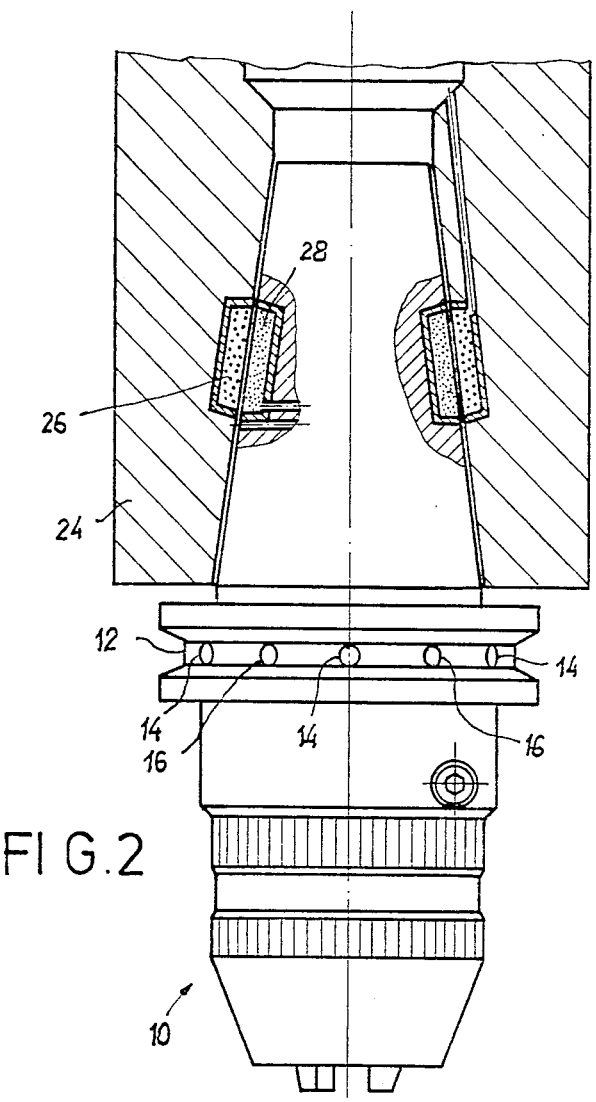
FIG. 2 is a view of a chuck inserted into a spindle head.

According to FIG. 2 a primary coil 26 is inserted into a spindle head 24 and a secondary coil 28 is inserted into the chuck 10 adjacent to the primary coil 26 for an inductive current supply.

The current supply for a circuit in the chuck 10 of the emodiment of FIG. 3 is provided by an accumulator 30 within the chuck 10. The chuck 10 is composed of a two-part housing 32, jaws 34 guided in a displaceable member 36 which is in screw engagement with a rotatable member 38 which in known manner can be rotated by a worm shaft 40 by means of a wrench to operate the jaws 34. Between an outward flange 42 of the rotatable member 38 and an annular shoulder 44 of the housing 32 a ball bearing ring 46, a solid supporting ring 48 and an annular body 50 are mounted in series between the annular flange 42 and the annular shoulder 44. With a tool clamped between the jaws 34 the axial component of the reaction force of the clamping pressure is transmitted to the annular body 50 via the parts 36,38,46 and 48 so that the annular body is pre-loaded. The supporting ring 48 has an axially projecting pin 52 extending through the annular body 50 and into an axial bore of the housing 32 in the area of the annular shoulder 44 thereof, thereby securing the annular body 50 against rotation.

The annular body 50 and a circular cylindrical block 54 associated at the rearward side therewith form a connected structural unit which contains the complete electronic equipment. This unit is inserted into a stepped cylindrical chamber of the housing 32.

Figure 4:
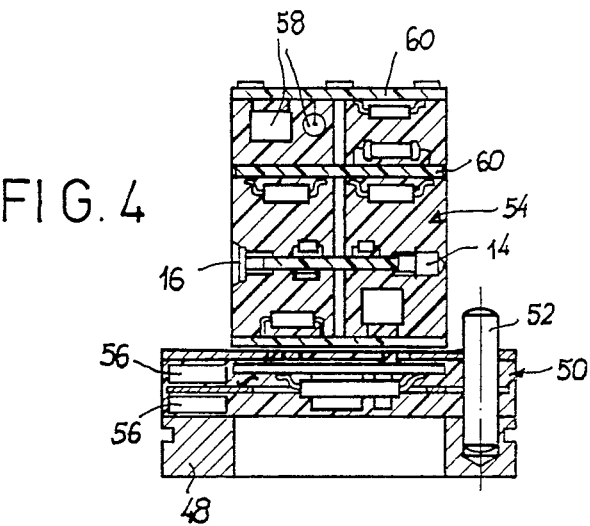
FIG. 4 is a sectional view of an electonic structure unit in larger scale inserted in the chuck of FIGS. 2 and 3.
Figure 5:
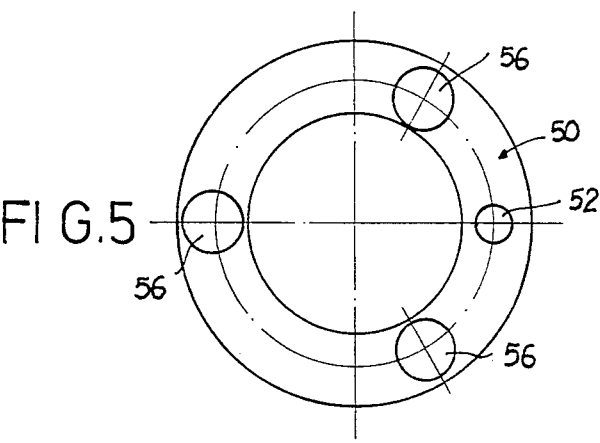
FIG. 5 is a front view of the unit according to FIG. 4.
Figure 6:
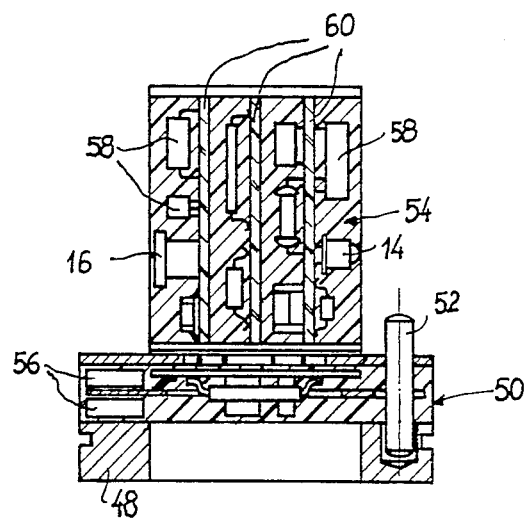
FIG. 6 is a sectional view of a modified electronic structure unit.

In the annular body 50 three pairs of pressure sensitive elements 56 are arranged with equal peripheral interspaces. The cylindrical block 54 of synthetic material contains a plurality of parallel plates 60 which in FIG. 4 are arranged in radial planes and in a second embodiment as shown in FIG. 6 in planes parallel with the rotating axis of the chuck 10. Electrical and electronic components 58 are fastened on the plates 60 and are electrically connected according to a circuit diagram to form a signal processing unit including an amplifier and connected with the pressure sensitive elements 56. The transmitting diodes 14 and the receiving diodes 16 are arranged within the cylindrical block 54 at the outside periphery thereof and alternate along the same radial plane with equal interspaces and are electrically connected with the amplifier of the signal processing unit. Each one of the diodes 14,16 is radially aligned with one of the radial bores 62 in the peripheral wall of the housing 32 so as to transmit and receive infrared signals through the bores 62, which are filled with a translucent material 64. Immediately behind the block 54 a cylindrical housing for the accumulator 30 is fitted into the portion of smaller diameter of the stepped cylindrical chamber. A central projection of the accumulator 30 and a contact ring of the cylindrical housing of the accumulator provide for current supply to the processing unit within block 54.

Figure 7:
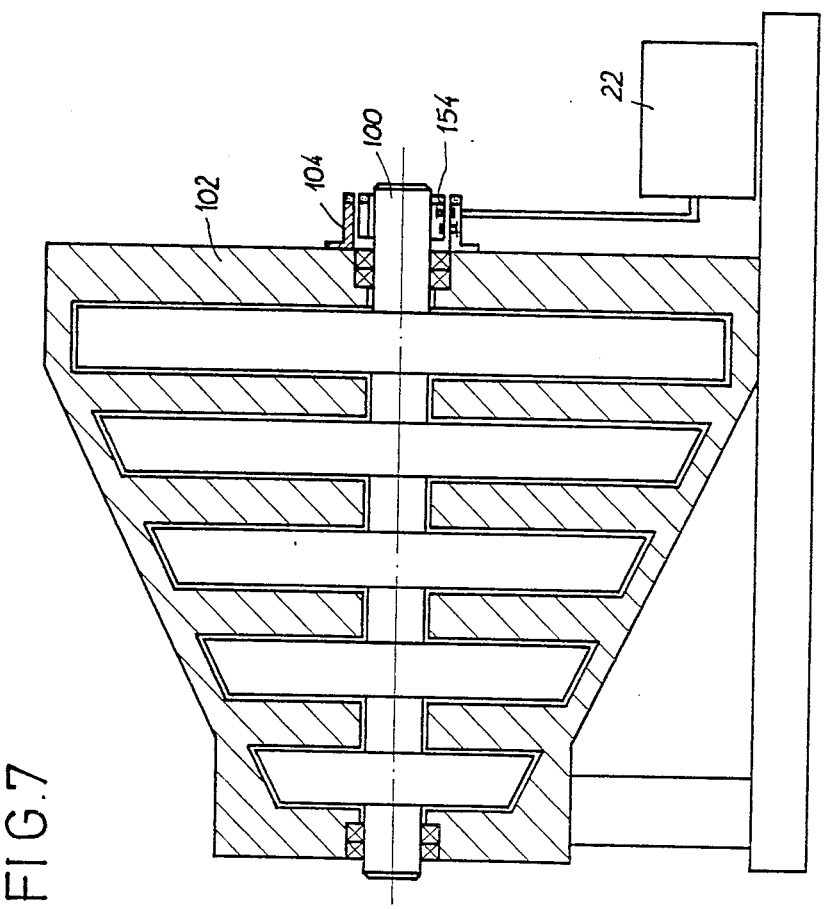
FIG. 7 is a diagrammatic sectional view of a turbine.

According to FIGS. 7 to 9 a ring-shaped moulded block 154 containing at least one plate on which the components of the signal processing unit are arranged, is fastened on a shaft 100 of a turbine 102. The signal processing unit is electrically connected with a sensor 156 which is inserted into a radial bore of the shaft 100 and pre-loaded by a screw ring. The block 154 is encircled with a clearance by a flanged muff 104 which is fastened at the housing of the turbine 102. In a first radial plane a plurality of peripherally spaced transmitting diodes 14 and in a parallel second radial plane a plurality of receiving diodes 16 are arranged within the block 154. A plurality of transmitting diodes 18a are arranged at the inner periphery of the muff 104 and spaced from one another so as to become opposed to the receiving diodes 16 upon rotation of shaft 100. A plurality of receiving diodes 18b are arranged in that first radial plane in muff 104 for receiving signals from the transmitting diodes 14. Current supply is achieved inductively by coils 26, 28. In this way, communication between the fixed turbine housing and the rotating shaft can be established so that, the signal processing unit on the shaft can be requested for signal output by control unit 22 via the transmitting diodes 18a and receiving diodes 16, whereby momentary detected values of sensor 156 are transmitted via the transmitting diodes 14 and receiving diodes 18b to the control unit 22.

Figure 11:
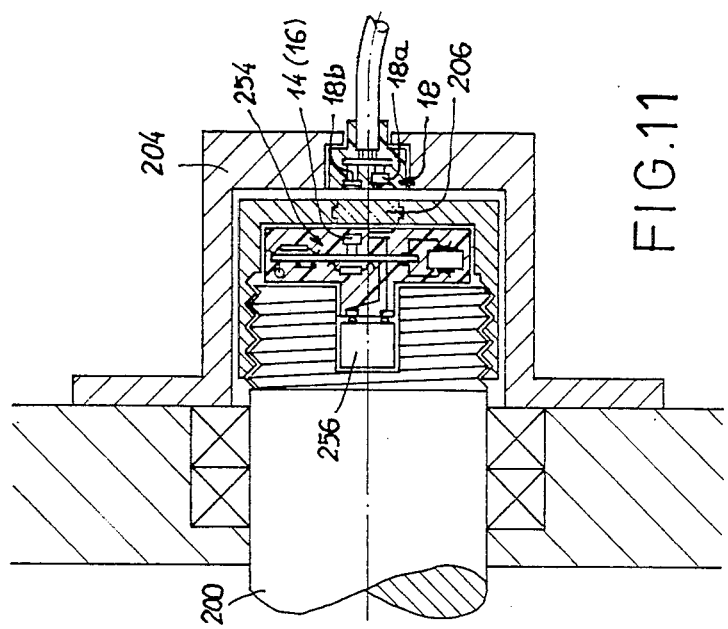
FIG. 11 is a sectional view of the end of the crankshaft of FIG. 10 in greater detail.
Figure 10:
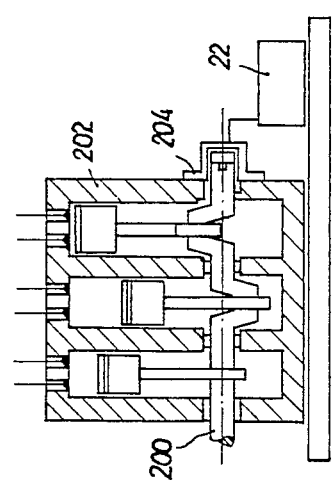
FIG. 10 is a diagrammatic sectional view of an internal combustion engine, having a crankshaft.

The embodiment according to FIGS. 10 and 11 comprises a moulded block 254 which is fastened at the front end of a crankshaft 200 of an internal combustion engine 202 by a screw cap. The crankshaft is provided with a coaxial hole in which a sensor 256 is inserted which is pre-loaded by a cylindrical projection of block 254. At the free front face of block 254 transmitting and receiving diodes 14,16 are arranged with peripheral interspaces along a circle and which communicate as described above with the stationary transceiving station 18, arranged in a cap 204 of the engine housing, through a translucent insert 206 within the screw cap.

I claim:

1. An arrangement for wireless signal transmission from a rotating body to a stationary receiving station comprising a current supply unit at least partly incorporated within the rotating body, the rotating body further comprising a receiving unit for receiving signals from a stationary transmitting station, a signal processing unit, a high precision sensor unit for detecting infinitesimal changes of working conditions of an item carried by said rotating body, and a transmitting unit for transmitting signals to the receiving station, the signal processing unit being operatively connected to the sensor unit and the receiving and transmitting units respectively, for causing the issuance of the output signal of the transmitting unit as a result of the input signal of the receiving unit.

2. An arrangement as claimed in claim 1, wherein at least an amplifier of the signal processing unit is activated upon a signal receiption of the receiving unit.

3. An arrangement as claimed in claim 1, wherein the transmitting unit comprises a plurality of transmitting elements arranged with peripheral interspaces in a common radial plane at right angles to the rotating axis of the rotating body and wherein the receiving unit comprises at least one receiving element also arranged in said common plane.

4. An arrangement as claimed in claim 1, wherein the transmitting unit comprises a plurality of infrared light emitting diodes and the receiving unit comprises a plurality of infrared photo-sensitive cells.

5. An arrangement as claimed in claim 1, wherein the rotating body is a chuck for items comprising tools and work pieces, the chuck comprising a housing, composed of a plurality of housing parts connected by screw joints, further comprising an axially displaceable non-rotable member for moving a plurality of jaws, a rotatable member being in screw engagement with the displaceable member, the rotatable member provided with an annular flange at the outer periphery thereof, an annular shoulder formed inside of the housing, a ball bearing ring, a solid supporting ring and an annular body mounted in series between the annular flange and the annular shoulder and contacting one another respectively, said sensor unit comprising a plurality of pressure sensitive elements arranged in said annular body with peripheral interspaces, said pressure sensitive elements axially pre-loaded by the axial reaction component of the clamping force by which said item is clamped between the jaws of the chuck.

6. An arrangement as claimed in claim 5, wherein a plurality of radial bores are provided at peripheral interspaces within at least one radial plane, said bores extending completely through the peripheral wall of the housing and opening with their inner ends into a cylindrical chamber within the housing and wherein a plurality of optoelectronic elements comprising light emitting diodes and photo-sensitive cells are provided within said cylindrical chamber adjacent to the inside periphery of the peripheral wall of the housing, each one of the optoelectronic elements arranged with its axis radially aligned with the axis of one of said bores, and wherein said plurality of bores are closed at least at their outside ends by a translucent material.

7. An arrangement as claimed in claim 6, wherein the housing of the chuck is provided with an outside annular flange, in which an annular groove is formed, and wherein said plurality of radial bores with their outside ends opening at the base of said groove.

8. An arrangement as claimed in claim 5, wherein the signal processing unit comprises a plurality of parallel spaced plates, electric and electronic components fastened on said plates, said plates encapsulated in a circular cylindrical block consisting of synthetic material, said block having a smaller diameter than the annular body and connected therewith thus forming together an axially insertable inserting unit, which is non-rotatably mounted within said housing.

9. An arrangement as claimed in claim 8, wherein said transmitting units and said receiving units are mounted within said block at the outside periphery thereof.

10. An arrangement as claimed in claim 8, wherein said plurality of parallel spaced plates are arranged in radial planes.

11. An arrangement as claimed in claim 8, wherein said plurality of parallel spaced plates are arranged in planes parallel with the axis of the rotating body.

12. An arrangement as claimed in claim 1, wherein said rotating body is fastened at a shaft of any one of an article of a group comprising machines, engines, pumps, turbines and rotors.

* * * * *